Figure 1:
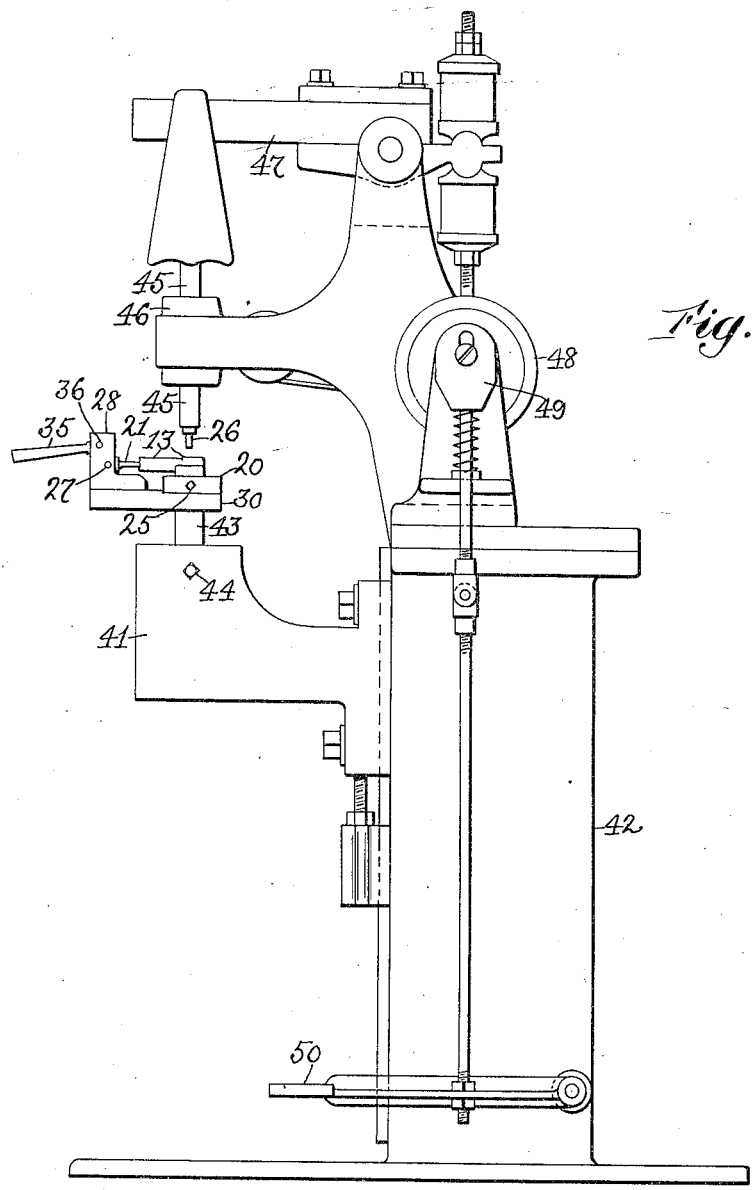

Aug. 12, 1924.
E. B. FEASTER
PEENING APPARATUS
Filed July 24, 1922
1,504,612
2 Sheets-Sheet 2
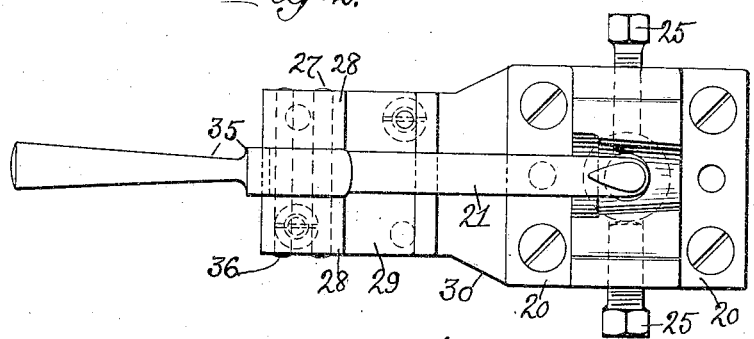
Fig. 2.
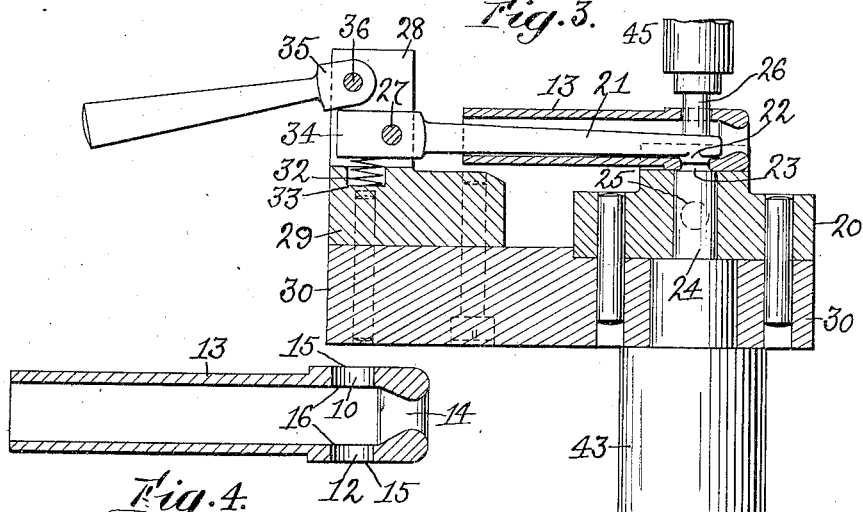
Fig. 3.
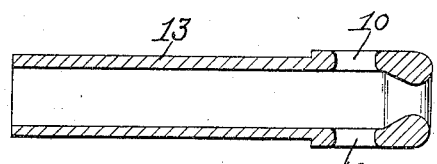
Fig. 4.
Fig. 5.
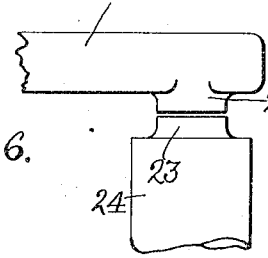
Fig. 6.
Inventor:
Edward B. Feaster
by Jas. H. Churchill
atty.

Patented Aug. 12, 1924.

1,504,612

UNITED STATES PATENT OFFICE.

EDWARD B. FEASTER, OF ARLINGTON, MASSACHUSETTS.

PEENING APPARATUS.

Application filed July 24, 1922. Serial No. 577,051.

*To all whom it may concern:*

Be it known that I, EDWARD B. FEASTER, a citizen of the United States, residing in Arlington, in the county of Middlesex and State of Massachusetts, have invented an Improvement in Peening Apparatus, of which the following description, in connection with the accompanying drawings, is a specification, like characters on the drawings representing like parts.

This invention has for its object to provide a peening tool or apparatus with which sharp edges of holes formed in articles, and especially metal articles, may be rounded and rendered smooth.

The invention further has for its object to provide a peening tool or apparatus with which sharp edges of diametrically opposite holes in a hollow object, and especially a metal object, may be rounded and rendered smooth on the exterior and interior of said hollow object.

The peening tool or apparatus is especially adapted for rounding the sharp edges of diametrically opposite holes in hollow cylindrical hubs or nose pieces employed in the construction of fliers for roving frames, such for instance as is shown and described in U. S. Patent No. 1,393,356, granted to me October 11, 1921.

To this end, the peening tool or apparatus is provided with an anvil, a hammer cooperating therewith, and co-operating members attached to said anvil and hammer and capable of being extended into the opposite ends of an opening in said hub, one and preferably both of said members having a curved surface to effect the rounding of one and preferably both of the sharp edges of said opening.

The particular features of the invention will be pointed out in the claims at the end of this specification.

Fig. 1 is an elevation of one form of machine provided with a peening tool embodying this invention.

Fig. 2, a plan view on an enlarged scale of the peening tool removed from the machine shown in Fig. 1.

Fig. 3, a vertical section of the peening tool shown in Fig. 2, with parts in elevation, to illustrate the operation of the machine shown in Fig. 1.

Fig. 4, a longitudinal section of the hub or nose piece shown in Fig. 3, before being peened.

Fig. 5, a longitudinal section of a hub or nose piece which has been peened with the apparatus shown in Fig. 1, and Fig. 6, an enlarged detail of the edge rounding members.

In the present instance, a peening tool is shown which is designed to round and smooth the sharp edges of two diametrically opposite holes 10, 12, in the hollow cylindrical hub or nose piece 13 of a flier not shown, but which is such as is shown and described in the patent referred to. The hubs or nose pieces 13 are provided at one end with an opening 14 through which the cotton or other fibrous yarn or thread is led into the hub or nose piece and is then passed out through one of the openings 10, 12 into the hollow arm of the flier as described in the patent referred to. The holes 10, 12 in the hub or nose piece are made in an automatic screw machine and are left by the tool of the said machine with the sharp external edges 15 and with sharp internal edges 16, as represented in Fig. 4, and if it were attempted to use the hub in this condition, the cotton or other yarn would be cut by the sharp edges of the outlet opening in the hub through which the yarn or thread was drawn, and especially the sharp edge on the interior of said hub. The present invention has for its object to provide a peening tool with which the interior sharp edge 16 and preferably also the exterior sharp edge 15 of the holes 10, 12 may be eliminated and the said edges rendered round and smooth.

To this end, the peening toool is provided with an anvil 20 to support the hub 13 and with a hammer 21 which is designed to enter the said hub.

The hammer 21 is provided on its under side with an edge rounding member, herein shown as an annular projection 22 of the proper size to enter either opening 10 or 12, and leave a slight clearance between said projection and the circumferential wall of the opening 10 or 12 into which the projection 22 is extended. The portion of the exterior surface of the projection 22 which is designed to engage the sharp interior edge 16 of the opening 10 or 12 is curved transversely with relation to the circumference of said projection. The anvil 20 is provided with an edge rounding member, herein shown as an annular projection 23 on the end of a rod or pin 24 and said projection is provided with a portion which is curved transversely with relation to the circumference of the projection and is designed to engage the sharp exterior edge 15 of the opening 10 or 12. The projection 23 is also of the proper size to enter the opening 10 or 12 and leave a slight clearance between it and the circumferential wall of said openings. The pin or rod 24 is fitted into an opening in the upper surface of the anvil 20 and is secured therein by set screws 25, and said upper surface is provided with a concavity to receive the hub 13. The edge rounding members are made of a length substantially equal to one-half the thickness of the walls of the opening 10 or 12, so that they may be brought substantially close together within said openings with a slight clearance between them, see Fig. 6, and thereby cause the circumferences of the said members when brought substantially close together, to form with the circumferential wall of the opening 10 or 12 an annular clearance space into which the metal of the sharp corners 15, 16 is forced or moved by the curved portions of the projections 22, 23, which engage said corners, and thereby provide round and smooth walls for the opening 10 or 12 on the interior and exterior of the hub, as represented in Figs. 3 and 5. The metal normally forming the sharp corners or edges of the opening 10 or 12 is forced into the annular clearance space formed by the members 22, 23, and the walls of the opening 10 or 12 by the hammer 21 being struck a series of rapid blows, which is effected by a striker or pin 26 extended through the opening opposite to the opening with whose walls the hammer and anvil cooperate.

The striker 26 may be operated by hand or by power, as will be described.

The hammer 21 is mounted on a pivot pin 27 supported by lugs 28 on a block 29 detachably secured to a base block 30 upon which the anvil 20 is fitted and detachably secured thereto. The hammer 21 has its outer end normally depressed toward the anvil by a spring 32 located in a socket 33 in the block 29 and engaging the rear arm or end 34 of the hammer, as shown in Fig. 1.

The hammer may have its front end elevated and locked in this position by a lever 35 mounted on a pivot pin 36 between the lugs 28, when it is desired to place an untreated hub 13 on the hammer and to remove the treated hub therefrom. As shown in Fig. 3, the lever 35 is turned back and the spring 32 is free to turn the hammer so as to enter its edge rounding member 22 into an opening in the hub, as for instance, the opening 12, and when it is desired to turn the hub on the hammer after treating one opening, as 12, and bring the opposite opening, as 10, into position for treatment, or to remove the treated hub, the lever 35 is turned into a substantially upright position, which causes its front end to depress the rear arm 34 of the hammer against the action of the spring 32 and thus elevate the front end of the hammer into a position wherein the treated hub can be readily removed therefrom, and an untreated hub slipped thereon.

The peening tool herein shown is capable of being applied to a high speed hammer, which may be of known or suitable construction, and in the present instance the base 30 of the peening tool is shown as provided with a pin 40 adapted to enter a suitable socket in the upper surface of a bracket 41, attached to an upright 42 of the high speed hammer of known construction. The pin 40 is provided with an enlarged portion 43 which rests upon the bracket 41. The pin 40 may be secured in its socket against turning by a set screw 44 or otherwise.

The striker 26 is detachably secured in any suitable manner to a rod 45 which is reciprocated at a high speed in a bearing 46 on the framework of the machine, and said rod is operatively connected with a lever 47, which in turn is operatively connected with a shaft provided with a driving pulley 48. The rotation of the shaft is controlled by a suitable clutch mechanism 49 operatively connected with a foot treadle 50. Inasmuch as the high speed hammer is of known construction, and does not form part of the present invention, it is not deemed necessary to illustrate the same in detail or to describe its construction specifically, as its function is to rapidly reciprocate the striker 26, which may be effected by hand, as above described, or by any other suitable form of high speed hammer.

From the above description, it will be seen that the hubs or nose pieces 13 of fliers may be quickly peened and have their holes 10, 12 provided with round and smooth edges over which the cotton or other yarn or thread may be rapidly drawn by the flier without danger of rupturing the said yarn or thread.

While it is desirable to provide both the hammer and anvil with edge rounding members so that both edges of the hole in a flier hub may be rendered round and smooth, it is not desired to limit the invention in this respect, as in some cases it may be found sufficient to round and smooth only one sharp edge, in which case, the edge rounding member may be omitted from the anvil or hammer, as the case may be.

If desired or required, the hub or nose piece after being peened as described, may be reamed or otherwise treated to remove any slight projecting portions of metal on opposite sides of the rounded corners or edges of the opening 10 or 12, which may be formed by the movement of the metal of the normally sharp corners in the peening operation.

Claims:

1. In an apparatus of the character described, in combination an anvil having a member for entering one end of an opening in the article to be peened and provided with a curved exterior surface which cooperates with the sharp edge of one end of said opening, a hammer pivoted at one end and having its free end cooperating with said anvil and provided with a member for entering the other end of said opening and having a curved exterior surface which cooperates with the sharp edge of the second mentioned end of said opening, and means for moving the free end of said hammer toward said anvil to cause the sharp edges of the opening to be rounded and smoothed.

2. In an apparatus of the character described, in combination, an anvil, a pivoted hammer cooperating therewith, and cooperating edge rounding members attached to said anvil and to the free end of said hammer and capable of being extended into the opposite ends of an opening in the article to be peened for effecting the rounding of the opposite edges of the said opening.

3. In an apparatus of the character described, in combination, an anvil, a pivoted hammer cooperating therewith, cooperating members attached to said anvil and to the free end of said hammer and capable of being extended into the opposite ends of an opening in said article, one of said members having a curved surface to effect the rounding of the edge of said opening with which it cooperates.

4. In an apparatus of the character described, in combination, an anvil having a concavity in its upper surface for the reception of a hollow cylindrical hub provided with an opening having sharp edges, an edge rounding member attached to said anvil and projecting above the bottom of said concavity and capable of entering the opening in said hub, a hammer having one end extended into the cavity of said anvil and capable of having the said hub placed thereon to lie in said cavity with the edge-rounding member of said anvil extended into an opening in said hub, and an edge rounding member attached to the end of the said hammer within the said cavity and capable of entering the end of the opening within said hub to cooperate with the edge rounding member carried by said anvil.

5. In an apparatus of the character described, in combination, an anvil having a concavity in its upper surface for the reception of a hollow cylindrical hub provided with an opening having sharp edges, an edge rounding member attached to said anvil and projecting above the bottom of said concavity and capable of entering the opening in said hub, a hammer pivoted at its rear end and capable of having the said hub placed on it from its front end, an edge rounding member attached to said hammer and capable of entering the end of the opening within said hub to cooperate with the edge rounding member carried by said anvil, means for moving the front end of the hammer toward the said anvil, and means for moving the front end of the hammer away from said anvil.

In testimony whereof, I have signed my name to this specification.

EDWARD B. FEASTER.